310-11 SR

FIP8502 OR 3,578,999

[redacted]

United States Patent

[11] 3,578,999

[72] Inventors Max Steenbeck;
Fritz Krause, Jena, Germany

[21] Appl. No. 843,919
[22] Filed July 23, 1969
[45] Patented May 18, 1971

[73] Assignee Deutsche Akademie Der Wissenschaften Zu Berlin
Berlin-Adlershof, Germany

[54] MAGNETOHYDRODYNAMIC ENERGY CONVERSION PROCESS
10 Claims, 10 Drawing Figs.

[52] U.S. Cl. ........................................................ 310/11
[51] Int. Cl. ........................................................ H02k 45/00, H02m 4/02
[50] Field of Search ........................................... 310/10, 11; 60/202; 103/1

[56] References Cited
UNITED STATES PATENTS
3,397,330 8/1968 Hori et al. ...................... 310/11

*Primary Examiner*—D. X. Sliney
*Attorney*—Michael S. Striker

ABSTRACT: A process for magnetohydrodynamic conversion of mechanical energy in an electrically conducting fluid flowing through a magnetic excitation field. A nonmirror symmetrical flow is applied to the fluid and a main magnetic field is established from the current flow arising from the electromotive force generated parallel to the excitation field. The electromotive force is generated as a result of the alpha-effect. The electrically conducting fluid serves as a conductor for the current flow and, at the same time, removes the heat generated during the process.

Patented May 18, 1971

3,578,999

3 Sheets-Sheet 1

INVENTOR
MAX STEENBECK
FRITZ KRAUSE

BY

ATTORNEY

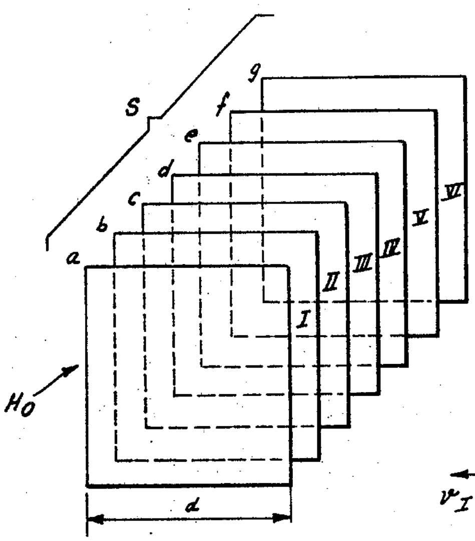
FIG. 2a
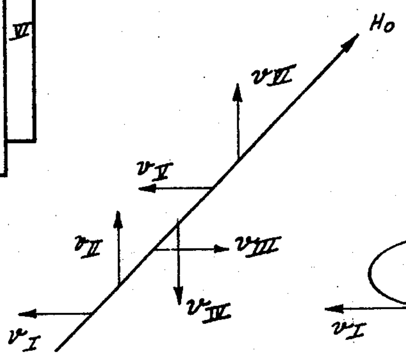
FIG. 2b
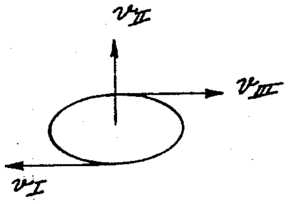
FIG. 2c
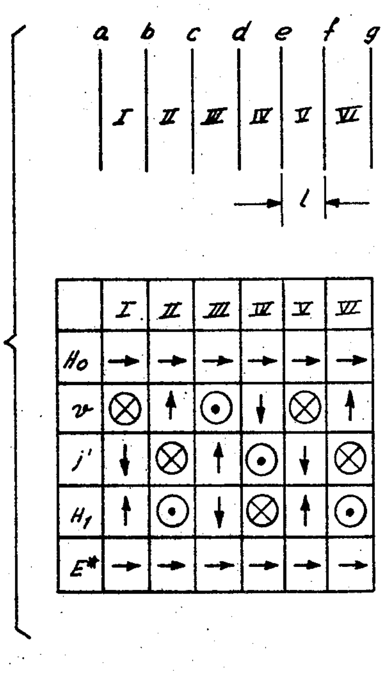
FIG. 2d
| FORMULA | UNITS | AMPLIFIER STAGE |
|---|---|---|
| $v$ | m/sek | $H_1 > H_0$ |
| $i = \mu \sigma v l\, H_0$ | A/m | |
| $H_0 = \frac{1}{2} \mu \sigma v l\, H_0$ | A/m | |
| $E^* = \frac{1}{2} \mu_0^2 \sigma v^2 l\, H_0$ | V/m | $H = \frac{1}{2} Re_m^2 \frac{d}{l} H_0$ |
| $i = \frac{1}{2} \mu_0^2 \sigma^2 v^2 l d\, H_0$ | A/m | $H \gg H_0$ |
| $H = \frac{1}{2} \mu_0^2 \sigma^2 v^2 l d\, H_0$ | A/m | $Re_m = \mu_0 \sigma l$ |
FIG. 2e
INVENTOR
MAX STEENBECK
FRITZ KRAUSE
BY [signature]
ATTORNEY Patented May 18, 1971

3,578,999

3 Sheets-Sheet 3

INVENTOR
MAX STEENBECK
FRITZ KRAUSE
BY
ATTORNEY

MAGNETOHYDRODYNAMIC ENERGY CONVERSION PROCESS

BACKGROUND OF THE INVENTION

The present invention resides in a process for the magnetohydrodynamic conversion of mechanical energy in a flowing electrically conducting fluid, into magnetic energy.

The present invention is based on the principle of using the alpha-effect through which it is possible to generate intensive or large static magnetic fields extending through space. The technical application of the process is designated as a hydromagnet.

The static magnetic fields which have been produced in conventional processes, heretofore, have been limited in their strengths through the mechanical forces appearing in the conducting stream. Furthermore, the conventional processes are limited through the resulting Joule's heat which must be conducted away. Very large or strong magnetic fields cannot be produced through superconductors, because the superconductivity disappears above a critical magnetic field intensity.

It is the object of the present invention to provide a process which uses the alpha-effect for producing very large magnetic fields. It is the object of the present invention to use an arrangement which possesses substantially a small amount of weight.

These objects of the present invention are achieved by applying a nonmirror symmetrical flow to an electrically conducting fluid. The fluid is passed in a magnetic excitation field. A large current results from the electromotive force arising as a result of the alpha-effect. The electromotive force is parallel to the excitation field. The current from this electromotive force produces the magnetic main field. Aside from being used for the production of the electromotive force, the electrically conducting fluid is also used as the conductor for the large current which generates the magnetic field. The electrically conducting fluid, furthermore, serves to remove the heat which results from the process, through the application of cooling mediums.

In further embodiments of the process of the present invention, one or more additional flow loops are used for the purpose of producing self-excitation of the magnetic excitation field, by utilizing the alpha-effect. A remote or separate magnetic field is provided for determining the polarity or sign of the magnetic field which is produced, at the begging of the self-excitation.

SUMMARY OF THE INVENTION

A process for magnetohydrodynamic conversion of mechanical energy within a flowing electrically conducting fluid. The fluid has applied to it a nonmirror symmetrical flow, and is directed through a magnetic excitation filed. An electromotive force is generated parallel to the excitation field, and as a result of the current flow arising from the electromotive force, a main magnetic field is established. The electrically conducting fluid serves to also conduct the current and, at the same time, removes the heat generated during the process. The electromotive force is generated as a result of the alpha-effect. Cooling mediums may be used along the flow path of the fluid to transfer the heat from the fluid. A remote magnetic field of substantially low intensity may be established for the purpose of determining the sign of the main magnetic field for beginning the self-excitation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIGS. 2*a* to 2*e* are schematic and tabular presentations of the conditions of the alpha-effect;

DESCRIPTION OF THE PREFERRED EMBODIMENTS

Figure 1A:
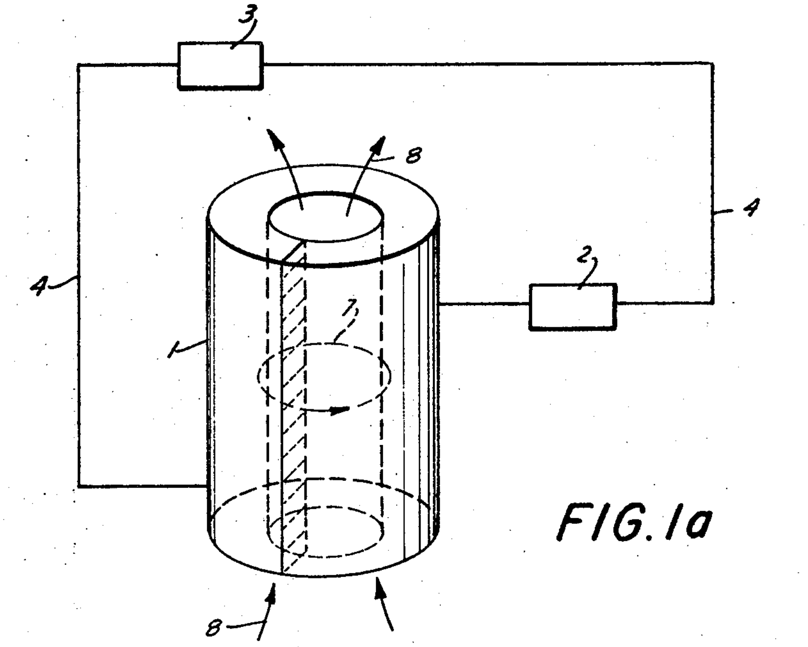
FIGS. 1*a* and 1*b* are functional schematic diagrams showing embodiments of hydromagnets.
Figure 1B:
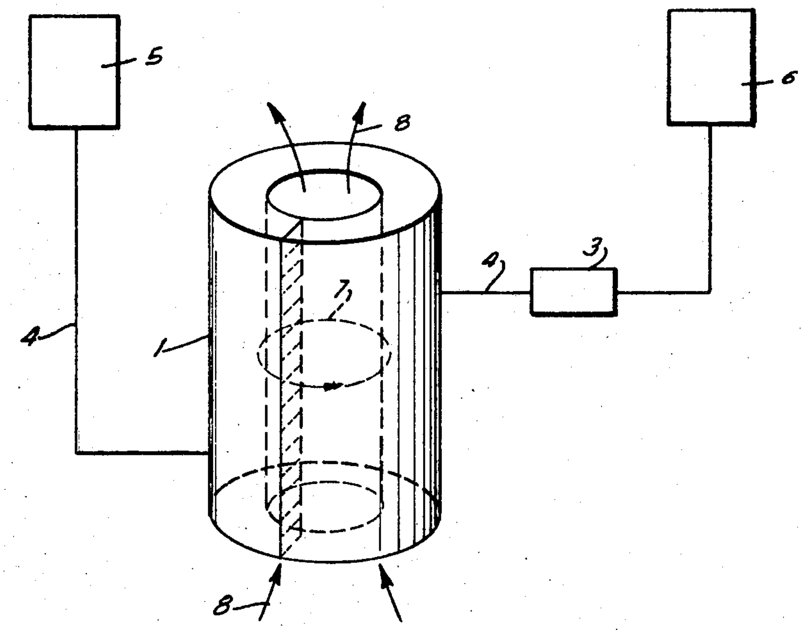

Referring to the drawing, FIGS. 1*a* and 1*b* show the manner for applying energy for the purpose of producing the current from an electrically good conducting fluid stream, somewhat in the form of fluid metal as, for example, sodium. The fluid is directed to the hydromagnet through one or more pumps and through pipelines. After passing through these hydromagnets, the fluid is passed through one or more cooling heat exchanges for the purpose of removing the generated heat. After passing through the heat exchanger, the fluid is then returned to the pump, by way of pipelines. It is also possible, in accordance with the present invention, to remove the conducting fluid from a storage tank which is under pressure.

In FIGS. 1*a* and 1*b*, the hydromagnet 1 is designed in the form of a hollow cylindrical pressure vessel. The pump 2, cooling heat exchanger 3, are interconnected through pipelines 4 which conduct the electrically conducting fluid. In FIG. 1*b*, two storage tanks 5 and 6 are provided in the place of the pump. The conducting fluid flows between these two storage tanks, by way of the hydromagnet 1 and the heat exchanger 3. The flow alternates periodically from storage tank 5 to storage tank 6 and vice versa. The process in accordance with the present invention provides that the fluid stream in the hydromagnet 1 produces an intense ring shaped closed current 7 which occupies substantially the entire cross section shown in the drawing in crosshatched form. Thus, this current 7 occupies substantially the entire cross section of the hydromagnet and is confined to the interior of the hydromagnet.

The hydromagnet requires no electrical insulating layers, and the entire volume of the hydromagnet is filled with the conducting fluid. The hydromagnet may also be provided with electrically good guiding surfaces for the purpose of achieving the required stream geometry. As a result of these conditions, the current 7 experiences only a very low electrical resistance in its path. Current of large magnitude is thereby realized, and the magnetic field 8 produced by this current, is the main field of the hydromagnet.

The process for producing the electrical current from the mechanical energy of a conducting fluid, rests on the use of the magnetohydrodynamic alpha-effect. The alpha-effect is based on the discovery that an electromotive force appears in the direction or opposite to the direction of a fluid-linked magnetic field in a nonmirror symmetrical stream of an electrically-conducting fluid medium.

FIGS. 2*a* to 2*d* show the conditions of this effect in its simplest form. FIG. 2*a* shows a number of plates *a*, *b*, *c*, *d*, ... which are situated side-by-side and which are made of electrically good conducting material. An electrically good conducting fluid is in good electrical contact with the plates when streaming through the channels I, II, III, ... between the plates. A substantially weak magnetic excitation field $H_o$ prevails perpendicular to the plates. The origin of this excitation field will be described subsequently.

FIG. 2*b* shows the direction of the velocities $v_I$, $v_{II}$, $v_{III}$ ... which represent velocities of the electrically conducting fluid through the channels I, II, III ... respectively. As may be seen from FIG. 2*b*, the stream directions form a right-handed screw in this illustrative example with reference to the excitation field $H_o$, but independent of the sign of Ho. Each stream direction is, moreover, surrounded by streams in its proximity. Thus referring to FIG. 2*c*, the velocity $v_{II}$ is surrounded by the $v_I$ and $v_{III}$. These surrounding streams form a left-handed screw, in accordance with their circulation.

Thus, a nonmirror symmetry or similar configuration in the stream geometry is the only condition for initiating the alpha-effect corresponding to an electromotive force parallel to the excitation field $H_o$. The electromotive force in the direction of the excitation field $H_o$ or in opposite direction thereto, arises from two inductance effects of the stream. FIG. 2d, shows the condition of these effects in detail. Reproduced in the upper half of this FIG., are the plates $a$, $b$, $c$, ... and the channels I, II, III ... of FIG. 2a when viewed from the right. The excitation field $H_o$ then is directed from the left to the right, as represented by the uppermost line of the table in FIG. 2d. The second line of this table shows, corresponding to FIG. 2b, the directions of the streams $v_I$, $v_{II}$, $v_{III}$ .... In this table the conventional symbol of a circle surrounding an X designates current flow away from the observer, whereas the circle containing a dot is used to designate current flow towards the observer. The third line of the table provides the direction of the electrical inductance current $i'$ produced from $b_o=\mu h_o$ and $v$. The inductance currents $i'$ close at the ends of the plates as, for example, $i'_{III}$ to each half with $i'_I$ and $i'_r$.

Figure 3:
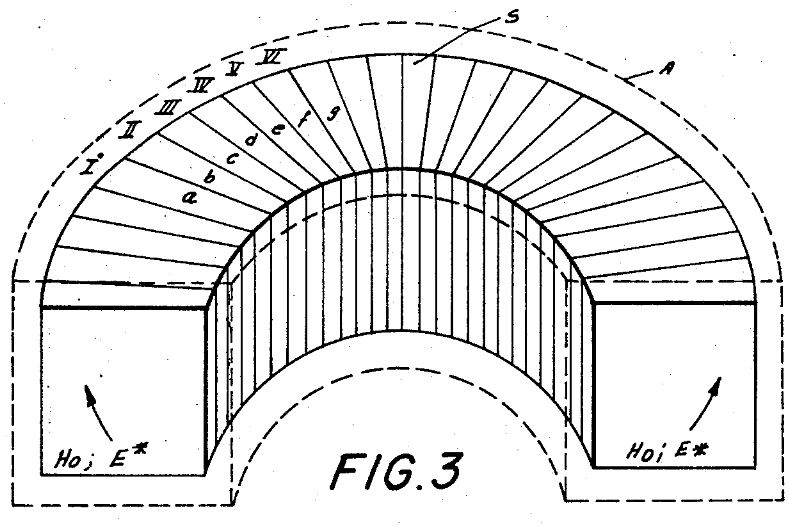
FIG. 3 is a sectional isometric view and shows the principle of a hydromagnet.

This current field $i'$ produces a magnetic field $H_1$ which has a direction in the individual channels shown by the fourth line of the table 2d. The strength of this magnetic field $H_I$ can be lager than the excitation field $H_o$. The magnetic field $H_I$ serves as the excitation field for producing the desired main current $i$ through renewed inductance effect with the velocity field $v_I$, $v_{II}$, $v_{III}$ ... of the fluid stream. The interaction $vxB_1=\mu vxH_1$ leads to an electromotive force E* which is directed parallel to $H_o$, as well as to the right in all channels with fluid volumes. This is shown by the last line of the table 2d. Consider the plate system S comprised of $a$, $b$, $c$ ... of FIG. 2a, to be in the form of a closed ring, as shown in FIG. 3. In this configuration the initial field $H_o$ is produced through, for example, a torus coil A represented in the drawing through broken lines. Under these conditions, the electromotive force E* leads to an azimuth-directed current $i$ which is designated by the reference numeral 7 in FIG. 1. This current $i$ gives rise to the desired magnetic field H of the hydromagnet 8, in FIG. 1.

This magnetic field H has a greater strength then the initial field $H_o$ for corresponding dimensions of the hydromagnet. Table 2e shows the applicable computation for the case in which the channel width $l$, shown in FIG. 2d, is small compared to the side dimension $d$ of the plates $a$, $b$, $o$ ... , shown FIG. 2a. This computation is based, furthermore, on the condition that the axial length of the cylindrical hydromagnet, FIG. 3, is large compared to the diameter of the hydromagnet. With the magnetic Reynold's number $$Re_m=\mu\sigma vl \text{ results } H_1 =\frac{1}{z} Re_m\cdot H_0 \text{ and } H=\frac{1}{2}(Re_m)^2\cdot d\cdot H_0$$

The main field H can be considerably greater than the initial field $H_o$ for sufficiently large values of the magnetic Reynold's number, and for large values of $d/l$.

Figure 4:
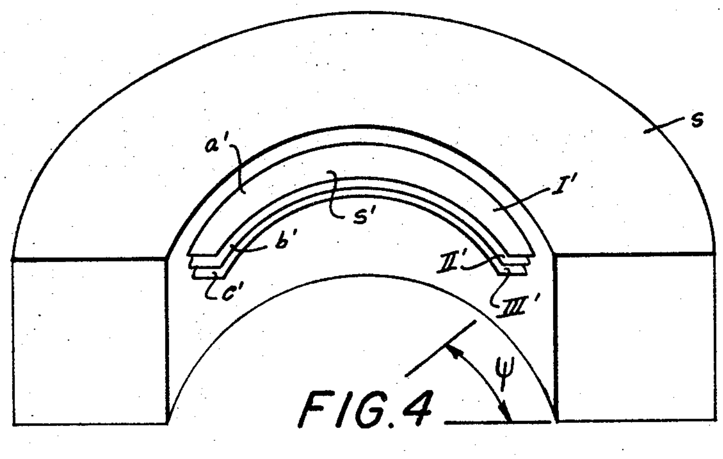
FIG. 4 is a partial view of a self-exciting hydromagnet in schematic form.

This initial field $H_o$ in FIG. 3, is generated through the coil or winding A designated by the broken lines, and not further described. A coil coupled to the torus of the hydromagnet can serve as a separate current source for this purpose. At the same time, it is also possible to produce this magnetic field $H_o$ without remote current sources and without the use of any insulating layers, as a result of the magnetohydrodynamic alpha-effect, analogous to the main filed. In this manner it is possible to drive the entire hydromagnet through self-excitation. This situation is shown in exemplary form in FIG. 4.

Aside from the plate system S used in FIG. 3, a second plate system S′ with ring-shaped plates $a'$, $b'$, $c'$ ... are provided within the interior of the cylindrical hydromagnet. The intermediate spaces I′, II′, III′ ... are subjected to flows of the conducting fluid which are out of phase by 90°, similar to that of FIG. 2. These flows flow alternately in radial and azimuth directions. Thus, channels I′, V′, IX′ ... correspond to direction $+r$, for example, whereas channels II′, VI′, X′ ... correspond to the $\psi$ direction. Channels III′, VIII′, XI′ ... correspond to the $-r$ direction, and channels IV′, VIII′, XII′ ...correspond to the $\psi$ direction. Through the alpha-effect, the system S′ produces an electromotive force in the direction of the axial main field H. The resulting axial current thereby closes over the body of the hydromagnet and produces thereby an azimuth excitation field $H_o$. Since the field H may be considerably larger than the field $H_o$, it is sufficient for self-excitation of the entire hydromagnet, when the excitation system S′ produces an azimuth field $H_o$ which is only l percent of the main field. Thus, H may equal 100 $H_o$. Accordingly, the excitation system S′ can be maintained considerably small in contrast with the main system S.

In order that self-excitation prevail, the fluid streams of the two systems S and S′ must flow in the same screw sense. This may be seen by referring for example, to FIg. 2. To produce a generated magnetic field H with a predetermined sign or polarity in an self-excited hydromagnet, it is sufficient to provide a remote weak starting field for a short interval, when turning on the fluid streams. Such self-excitation then leads to generating a field in that direction till a static end value is realized. This end value can be determined and regulated through the power of the pumping system.

Figure 5:
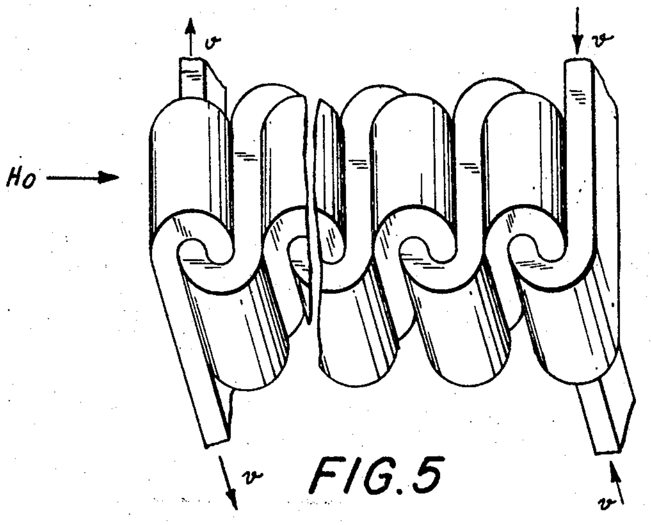
FIG. 5 is an isometric view of an embodiment for producing a nonmirror symmetrical flow.

The manner in which the nonmirror symmetrical fluid streams are realized individually, is not the object of the present invention. In the embodiment described, the channels I, III, V ... in horizontal direction, may be connected in series through deflection of the streams at the plate ends of FIG. 2. The same applies to the vertical channels II, IV, VI .... The required space is thereby determined only through the magnitude of the plate spacing, and is thereby small compared to the extension of the plates. The stream configuration then consists of two individual streams, as shown in FIG. 5, which have many layers that are folded and interleaf with one another. It is also possible to provide a parallel arrangement in individual channels or partial systems of channels, for the purpose of driving the fluid stream with light or small hydrostatic pressure. The repumped fluid quantities are thereby made correspondingly larger. The particular arrangement to be used depends upon the individual application and is immaterial from the viewpoint of the principle.

In the process described above, special advantages may be realized in producing magnetic fields in the following cases:

1. Production of Very Large Static Magnetic Fields

The process aims at increasing considerably the limit previously described. This is due to the condition that all mechanical forces are received by a pressure vessel, and not by a current conductor. Aside from this, no insulating material with limited mechanical strength is used, and the transfer of the resulting heat may be stepped up by an almost unlimited amount. To transfer the heat, no special cooling medium is required, into which the heat must first transfer from the current conductor. The electrically conducting fluid takes itself the heat generated within it, and can transfer this heat to a separately arranged cooling medium outside of the hydromagnet. If needed, the fluid stream can be lead through a number of intermediate coolers situated along the path through the hydromagnet. In this manner, any desired amount of heat can be conducted away. The strength of the magnetic field realized from a hydromagnet in the above-described manner, is limited only through the mechanical strength of the pressure vessel and the available pumping power. Through the use of corresponding equipment, extended static magnetic fields may be achieved with an intensity or strength of the order of one million Oersted.

2. Magnets of Low Weight

When operating with fluid sodium, a hydromagnet of the aforementioned type is substantially lighter in weight than a conventional electromagnet with ferromagnetic core and copper winding, assuming equal intensities for the magnetic fields and equal extension of the fields. The hydromagnet of the present invention is therefore particularly adaptable for use when low weight is necessary.

3. Generating Magnetic Walls for Fusion Reactors

For the containment of the plasma of a hydrogen fusion reactor, magnetic walls are required. These are extended magnetic fields which are of high intensity in at least some locations, and which are in part of complex geometry for surrounding completely the hot reaction space. For producing such magnetic fields, the process described above is particularly adapted:

a. The hydromagnet can function in the form of an electromagnet with fixed current conductors at high temperatures.
b. The hydromagnet does not require any electrical insulation.
c. Complicated or complex magnetic field configurations (stellerator, Joffe bottle, etc.) can be produced through corresponding arrangements of the fluid streams. Since all mechanical forces are sustained by the pressure vessel, and electrical potential differences need not be taken into account, advantageous possibilities are available for the selection of an optimum magnetic field geometry. In mirror machines, the plasma losses can be substantially reduced through the strength of the magnetic field which may be produced.
d. The cooling equipment of the hydromagnetic system generated for producing the magnetic walls, can be used as a steam generator because of the high operating temperature. Thus, such cooling equipment may be used to convert the heat resulting from the reactor, into electrical energy. In this manner, a substantial portion of Joule's heat realized in producing the magnetic field, is again utilized.
e. Due to the high allowable operating temperature of the hydromagnet, the required fluid streams may be realized through local steam formation instead of through special pumps. Such local steam formation may stem form the heated fluid of the fusion reactor.

The examples described here for the possible applications of the process for producing magnetic fields through the use of the magnetohydrodynamic alpha-effect, are not the particular object of the present invention. Instead, these examples serve only the purpose of clarifying the process and its advantages.

It will be understood that each of the elements described above, or two or more together, may also find a useful application in other types of constructions differing from the types described above.

While the invention has been illustrated and described as embodied in magnetohydrodynamic processes, it is not intended to be limited to the details shown, since various modifications and structural changes may be made without departing in any way from the spirit of the present invention.

What is claimed as new and desired to be protected by Letters Patent is set forth in the appended

We claim:

1. A process for magnetohydrodynamic conversion of mechanical energy of a flowing electrically conducting fluid comprising the steps of: applying nonmirror symmetrical flow to said electrically conducting fluid; directing the flow of said fluid through a magnetic excitation field; and establishing a main magnetic field from current flow arising from the electromotive force generated parallel to the excitation field by said nonmirror symmetrical flow of said electrically conducting fluid, said electrically conducting fluid conducting said current and removing heat generated in said process.

2. The process for magnetohydrodynamic conversion of mechanical energy as defined in claim 1 including the step of forming at least one nonmirror symmetrical flow for self-exciting said magnetic filed.

3. The process for magnetohydrodynamic conversion of mechanical energy as defined in claim 1 including the step of transferring heat from said fluid to cooling means.

4. The process for magnetohydrodynamic conversion of mechanical energy as defined in claim 1 wherein said current flow is closed within said electrically conducting fluid.

5. The process for magnetohydrodynamic conversion of mechanical energy as defined in claim 1 wherein the magnitude of said current flow is substantially large.

6. The process for magnetohydrodynamic conversion of mechanical energy as defined in claim 1 wherein said current flow is undivided through said electrically conducting fluid.

7. The process for magnetohydrodynamic conversion of mechanical energy as defined in claim 1 including the step of cooling said electrically conducting fluid along the path of flow of said fluid.

8. The process for magnetohydrodynamic conversion of mechanical energy as defined in claim 1 including the step of generating a remote field for establishing the sign of said main magnetic field.

9. The process for magnetohydrodynamic conversion of mechanical energy as defined in claim 8 including the step of generating a remote field for establishing the sign of said main magnetic field for the beginning of the self-excitation of said excitation field.

10. The process for magnetohydrodynamic conversion of mechanical energy as defined in claim 9 wherein said remote field is substantially a low intensity field.